United States Patent Office
2,910,510
Patented Oct. 27, 1959

2,910,510

PROCESS OF PREPARING TERTIARY ACETYLENIC CARBINOLS

Thomas F. Rutledge, Madison, N.J., assignor to Air Reduction Company, Incorporated, New York, N.Y., a corporation of New York No Drawing. Application July 25, 1956
Serial No. 599,901

5 Claims. (Cl. 260—618)

This invention relates to unsaturated or acetylenic tertiary carbinols, and to a method of making the same. More specifically, it relates to an improved method of reacting sodium acetylide with an alkyl aryl ketone in selective organic diluents or reaction media to obtain a tertiary acetylenic carbinol.

It has been proposed heretofore to react sodium acetylide with carbonyl compounds in various reaction media to form acetylenic carbinols. For example, sodium acetylide has been reacted with ketones in the presence of ether or benzene, but generally this reaction is difficult to control, and undesirable by-products are formed. It has been improved upon by carrying out the reaction in liquid ammonia; however, the presence of ammonia involves objectionable features which are well known in the art. Solutions of alkali metals in liquid ammonia act as reducing agents and reduce acetylenic compounds to the corresponding ethylenic derivatives. Further, liquid ammonia is difficult to handle; in some instances it forms undesirable by-products; and, if it is subjected to elevated temperatures and superatmospheric pressures, the reaction conditions are admittedly hazardous.

One object of this invention is to provide an improved method of reacting sodium acetylide with alkyl aryl ketones; another object is to effect the reaction of sodium acetylide with alkyl aryl ketones in a selective reaction medium at favorable temperatures and pressures; and a further object is to provide a rapid and efficient reaction for producing acetylenic carbinols.

In accordance with the invention, an alkyl aryl ketone is reacted with a dispersion of finely-divided sodium acetylide, advantageously consisting mostly of particles less than 25 microns in diameter, in a selective organic liquid which is substantially inert with respect to the reactants and products of reaction, under controlled temperature conditions, to produce the desired carbinol. In a preferred and especially advantageous embodiment of the invention, the sodium acetylide is prepared according to the process of the copending application of Thomas F. Rutledge and Alio J. Buselli, Serial No. 391,139, filed November 9, 1953, "Process for Producing Sodium Acetylide and Improved Sodium Acetylide Product" now Patent 2,777,884. The sodium acetylide prepared by the process of the Rutledge et al. application can be at least 95% pure, containing less than around 1% of either or both sodium hydroxide and sodium carbonate, and is characterized principally by being a virtually white, free-flowing powder, mainly less than 5 microns in diameter, which can be wetted by inert liquids without undesirable coalescence of the particles.

I have found that the reaction of sodium acetylide with an alkyl aryl ketone can be effected in an organic liquid medium comprising the cyclic ether dioxane, to form acetylenic carbinols in excellent yields based on the ketone. While dioxane has a very specific action in promoting this reaction, the exact mechanism or manner in which it serves is not clearly understood. It may be that dioxane acts as a catalyst; or it takes part in the reaction in some manner; or that some of its physical factors are involved.

Dioxane is a colorless liquid, having a melting point of 11° C. and a boiling point of 101° C. Its boiling point is well above the reaction temperatures of this invention. Dioxane is inert with respect to sodium acetylide, the alkyl aryl ketone, or the products of reaction.

When reacting the improved sodium acetylide with an alkyl aryl ketone in the cyclic ether dioxane, excellent yields of tertiary acetylenic carbinols, containing an aryl group, are obtained according to the reaction represented by the following equations:

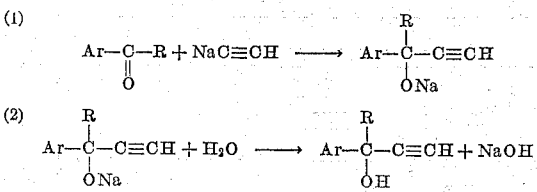

where Ar is an aryl such as phenyl, tolyl, xylyl, or naphthyl; and R is an alkyl such as methyl, ethyl, propyl, or isobutyl. As shown in Equation 1, sodium acetylide reacts with an alkyl aryl ketone to form the sodium salt of the acetylenic carbinol; and as shown in Equation 2, such salt is decomposed by water to form sodium hydroxide and the desired carbinol.

Briefly, sodium acetylide is prepared according to the process of said copending application by adding a dispersion of sodium (in xylene, for example) in a liquid such as di-n-butyl ether in a reactor equipped with a thermometer, heater, stirrer and acetylene inlet. Dry, purified acetylene is bubbled into the dispersion at a temperature of from 100° C. to 110° C. After the evolution of hydrogen has stopped, the reaction resulting in the production of sodium acetylide has been completed. The sodium acetylide is dispersed in the di-n-butyl ether in a fine state of sub-division, around 5 microns or less in diameter. The sodium acetylide thus prepared can be separated from the reaction medium by some conventional means (such as filtration or centrifugation) and substantially dried, for example, by vacuum drying. It can then be dispersed in the reaction medium of this invention, dioxane, for subsequent reaction with an alkyl aryl ketone such as acetophenone.

In carrying out a process of the invention, an alkyl aryl ketone is added to the suspension of sodium acetylide in dioxane at a temperature of about 40° C. to 80° C. and at such a rate as to maintain an easily controlled reaction. After the desired reaction time, usually six to seven hours, water is added to decompose the salt. The aqueous layer of sodium hydroxide is removed; the other layer is neutralized (e.g., with carbon dioxide), and the solvent and any unreacted ketone are separated from the carbinol formed, by distillation.

The following examples will serve only to illustrate the invention more fully, and accordingly they are not to be construed as limiting the scope of the invention.

EXAMPLES 1–7

A dispersion of sodium in xylene, corresponding to 0.25 mole of sodium metal, was added to 300 ml. of xylene in a glass reactor which was equipped with a stirrer condenser, thermometer, acetylene inlet tube, and an electric heating mantel. The xylene was of a commercial grade which had been freed of water and low boiling material by distillation. The mixture was heated to 100° C. while stirring. Dried purified acetylene gas was bubbled into the dispersion at about 100° C. After about two hours, no further evolution of hydrogen was recorded by a hydrogen analyzer in the exit gas stream. The flow of acetylene was discontinued, and the mix allowed to cool to room temperature. The sodium acetylide was separated from the reaction medium (xylene) by filtration and substantially dried by vacuum drying. The filtered and dried sodium acetylide was resuspended in 500 ml. dioxane in a one liter flask equipped with a stirrer, dropping funnel, and water-cooled reflux condenser. The size of sodium acetylide particle was less than 5 microns in diameter. The mixture was heated from about 40° C. to 80° C., and acetophenone was added over a period of two to five hours. For simplicity, the details as to amounts of reactants, total volumes of dioxane, the times of reaction, reaction temperatures, and yields of 3-phenyl-1-butyn-3-ol in mole percentages based on acetophenone are tabulated below.

Table 1

| Examples | 1 | 2 | 3 | 4(a) | 5 | 6 | 7 |
|---|---|---|---|---|---|---|---|
| Reactants: | | | | | | | |
| Sodium acetylide, moles | 1 | 1 | 1 | 1 | 2 | 1 | 1 |
| Acetophenone, moles | 1 | 1 | 1 | 1 | 2 | 1 | 1 |
| Diluent, dioxane: | | | | | | | |
| Total volume, liters | 0.5 | 0.5 | 0.5 | 0.5 | 0.5 | 0.5 | 0.5 |
| Reaction conditions: | | | | | | | |
| Time, hours | 7 | 72 | 6 | 6 | 6 | 7 | 6 |
| Temperature, °C | 40 | 40 | 60 | 60 | 60 | 70 | 70 |
| Yield of 3-phenyl-1-butyn-3-ol: | | | | | | | |
| Mole per cent | 78 | 83 | 86 | 90 | 92 | 88 | 89 |

(a) Mixture saturated with acetylene during reaction.

The data in Table 1 shows that the use of dioxane as the reaction medium strongly favors the reaction between finely-divided sodium acetylide and an alkyl aryl ketone such as acetophenone. Conducting the process at atmospheric pressures and moderate temperatures, excellent yields of 3-phenyl-1-butyn-3-ol are obtained in a relatively short period of time (6 to 7 hours). In general, the sodium acetylide and acetophenone are employed in equimolecular proportions, although an excess of one or the other of the reactants may be used. In all the examples, total 3-phenyl-1-butyn-3-ol was confirmed by standard iodomercurate analysis. It is noted from the examples that the optimum ratio of reactants to diluent is 8 moles of reactants per liter of dioxane (see Example 5). Using such ratio, the yield of the acetylenic carbinol was 92 mole percent based on acetophenone. Obviously, a relatively great diluent effect controls the reaction of the invention. The effect of other variables such as time and temperature is also demonstrated for the dioxane system in Examples 1–7. While the various examples indicate excellent yields of 3-phenyl-1-butyn-3-ol when the reaction temperature is within the range of 40° C. to 70° C., optimum conversion of acetophenone to the carbinol occured at reaction temperatures between about 50° C. to 80° C. The conversion at such reaction temperatures was about 65 to 80 mole percent based on acetophenone.

It is evident that utilization of the present invention makes possible the preparation of tertiary acetylenic carbinols containing an aryl group in much better yields than have heretofore been possible. Further, the process of the invention is safer to conduct than are the prior art processes involving potentially hazardous solvents, such as ammonia.

While the above examples disclose the use of acetophenone specifically for reacting with sodium acetylide, it will be understood that an aryl alkyl ketone broadly may be reacted with sodium acetylide dispersed in dioxane to produce a tertiary acetylenic alcohol containing an aryl group. The aryl alkyl ketone may be propiophenone, butyrophenone, methyl tolyl ketone, methyl xylyl ketone, methyl naphthyl ketone, etc. It will be noted that the preceding examples of ketones are either phenyl alkyl ketones or substituted phenyl alkyl ketones. The term, phenyl, alkyl ketone as used herein, shall be construed to include both the phenyl and substituted phenyl alkyl ketones.

The invention is not limited to the specific embodiments described herein, but may be practiced in other ways without departing from the spirit and scope of the invention as defined by the following claims.

What we claim is:

1. A process of preparing a tertiary acetylenic carbinol containing a phenyl group by effecting the reaction of sodium acetylide with an alkyl phenyl ketone which comprises reacting a phenyl alkyl ketone and finely divided sodium acetylide dispersed in a reaction medium consisting essentially of dioxane, the dispersed sodium acetylide particles being preponderantly less than 25 microns, conducting the reaction at a temperature of 40° to 80° C., hydrolyzing the reaction product, and isolating the tertiary acetylenic carbinol containing the phenyl group.

2. A process for producing 3-phenyl-1-butyn-3-ol which comprises reacting acetophenone and finely-divided sodium acetylide dispersed in a reaction medium consisting essentially of dioxane, the dispersed sodium acetylide particles being preponderantly less than 25 microns, conducting the reaction at a temperature of from 40° to 80° C., hydrolyzing the sodium salt of the carbinol product, and isolating 3-phenyl-1-butyn-3-ol.

3. A process for producing 3-phenyl-1-butyn-3-ol in accordance with claim 2 wherein the ratio of said sodium acetylide to said dioxane medium is about 4 moles of sodium acetylide per 1 liter of said medium.

4. A process for producing 3-phenyl-1-butyn-3-ol which comprises reacting acetophenone and finely-divided sodium acetylide dispersed in a reaction medium consisting essentially of dioxane, the mole ratio of said acetophenone to said sodium acetylide being about 1 to 1, the dispersed sodium particles being less than 25 microns, the ratio of said sodium acetylide to said dioxane being about 4 moles of sodium acetylide per 1 liter of dioxane, conducting the reaction at atmospheric pressure and at a temperature of 50° to 80° C., hydrolyzing the sodium salt of the carbinol product, and isolating 3-phenyl-1-butyn-3-ol.

5. A process for producing 3-phenyl-1-butyn-3-ol which comprises dispersing finely-divided sodium acetylide in a reaction medium consisting essentially of dioxane, adding acetophenone to said dispersion for reaction with said sodium acetylide while agitating and heating said mixture to a temperature of 50° to 80° C., the dispersed sodium acetylide particles being preponderantly less than 25 microns, the mole ratio of said acetophenone to said sodium acetylide being about 1 to 1, thereafter, when the reaction is substantially completed, adding water to the reaction mixture in an amount sufficient to effect hydrolysis of the sodium compound of the carbinol product and to form an aqueous solution of sodium hydroxide, and thereafter separating the 3-phenyl-1-butyn-3-ol.

References Cited in the file of this patent

UNITED STATES PATENTS

| 2,125,384 | Macallum | Aug. 2, 1938 |
| 2,425,201 | Oroshnik | Aug. 5, 1947 |
| 2,435,524 | Weizmann | Feb. 3, 1948 |